United States Patent
Kozaki (10) Patent No.: US 10,683,893 B2
(45) Date of Patent: Jun. 16, 2020

(54) MAGNETIC BEARING DEVICE AND VACUUM PUMP

(71) Applicant: SHIMADZU CORPORATION, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 366 days.

(21) Appl. No.: 15/721,767

(22) Filed: Sep. 30, 2017

(65) Prior Publication Data

US 2018/0238386 A1  Aug. 23, 2018

(30) Foreign Application Priority Data

Feb. 17, 2017 (JP) ................................ 2017-027994

(51) Int. Cl.
*F16C 32/04* (2006.01)

(52) U.S. Cl.
CPC ...... *F16C 32/0446* (2013.01); *F16C 32/0451* (2013.01); *F16C 32/0459* (2013.01); *F16C 32/0489* (2013.01); *F16C 32/0468* (2013.01); *F16C 2360/45* (2013.01)

(58) Field of Classification Search
CPC .............. F16C 32/0446; F16C 32/0451; F16C 32/0459; F16C 32/0489; F16C 32/0468; F16C 2360/45
See application file for complete search history.

(56) References Cited

U.S. PATENT DOCUMENTS

| 4,445,061 A * | 4/1984 | Jackson, Jr. | ............ H02K 21/14 310/156.08 |
| 2007/0188966 A1* | 8/2007 | Kawashima | .......... F04D 19/042 361/144 |
| 2008/0206079 A1* | 8/2008 | Okuda | .................. F04D 19/042 417/423.4 |
| 2009/0028720 A1* | 1/2009 | Tsunazawa | ........... F04D 19/042 417/32 |
| 2009/0246048 A1* | 10/2009 | Kawasaki | ............. F04D 17/168 417/423.4 |

(Continued)

FOREIGN PATENT DOCUMENTS

| EP | 0716241 A1 | 6/1996 |
| EP | 1517042 A1 | 3/2005 |

(Continued)

OTHER PUBLICATIONS

Office Action for corresponding Chinese App. No. 2017107576985, dated Apr. 17, 2019.

(Continued)

*Primary Examiner* — Emily P Pham
(74) *Attorney, Agent, or Firm* — Renner, Otto, Boisselle & Sklar, LLP (57) ABSTRACT

A magnetic bearing device comprises a radial magnetic bearing configured to magnetically levitate and support a rotor shaft in a radial direction; an axial magnetic bearing configured to magnetically levitate and support, in an axial direction, a rotor disc rotatable together with the rotor shaft; and an axial displacement sensor disposed on a surface of an electromagnet core of the axial magnetic bearing facing the rotor disc and configured to detect axial displacement of the rotor disc.

7 Claims, 11 Drawing Sheets

(56) References Cited

U.S. PATENT DOCUMENTS

| | | | |
|---|---|---|---|
| 2013/0147296 A1* | 6/2013 | Kozaki | H02K 7/09 310/90.5 |
| 2014/0219841 A1* | 8/2014 | Kozaki | F04D 19/042 417/423.12 |
| 2016/0195098 A1* | 7/2016 | Omori | F04D 19/042 417/423.7 |
| 2016/0377086 A1 | 12/2016 | Lee | |
| 2017/0110930 A1* | 4/2017 | Kozaki | F16C 32/0451 |
| 2018/0216665 A1* | 8/2018 | Kozaki | F16C 32/0457 |

FOREIGN PATENT DOCUMENTS

| | | |
|---|---|---|
| JP | 1992000014 A | 1/1992 |
| JP | H04-1992000014 A | 1/1992 |
| JP | H06-1994046036 B2 | 6/1994 |
| JP | 2005076792 A | 3/2005 |
| JP | 2017-20520 | 1/2017 |

OTHER PUBLICATIONS

Office Action for corresponding Chinese App. No. 2017107576985, dated Dec. 18, 2019 with English language translation.

Reasons for Refusal for corresponding Japanese Application No. 2017-027994, dated Feb. 25, 2020, with English language translation.

* cited by examiner

MAGNETIC BEARING DEVICE AND VACUUM PUMP

BACKGROUND OF THE INVENTION

1. Technical Field

The present invention relates to a magnetic bearing device and a vacuum pump.

2. Background Art

Ina turbo-molecular pump, a magnetic bearing is employed as a rotor supporting bearing for realizing an oil-free configuration. For the turbo-molecular pump, a five-axis control magnetic bearing is commonly used (see, e.g., Patent Literature 1 (JP-A-2017-20520)). In the five-axis control magnetic bearing used for the turbo-molecular pump, axial displacement of a rotor is detected by a single axial displacement sensor for the reason that a complicated structure is avoided, for example.

In the magnetic bearing device described in Patent Literature 1, a nut for fixing, to a rotor shaft, a rotor disc as a component of an axial magnetic bearing is a sensor target, and the inductance axial displacement sensor is mounted on a sensor target facing surface of a substrate fixed to an axial electromagnet. For this reason, a lamination error is easily caused when the axial displacement sensor is stacked and disposed, and a distance between the nut and the substrate changes depending on the degree of fastening of the nut. Thus, a gap dimension between the axial displacement sensor and the sensor target varies among machines. As a result, electric offset adjustment for sensitivity of the axial displacement sensor needs to be performed for each machine, leading to a problem that an adjustment process requires great care.

SUMMARY OF THE INVENTION

A magnetic bearing device comprises: a radial magnetic bearing configured to magnetically levitate and support a rotor shaft in a radial direction; an axial magnetic bearing configured to magnetically levitate and support, in an axial direction, a rotor disc rotatable together with the rotor shaft; and an axial displacement sensor disposed on a surface of an electromagnet core of the axial magnetic bearing facing the rotor disc and configured to detect axial displacement of the rotor disc.

The axial magnetic bearing includes a first axial electromagnet disposed facing a front side of the rotor disc, and a second axial electromagnet disposed facing a back side of the rotor disc. The axial displacement sensor includes a first sensor disposed on a surface of an electromagnet core of the first axial electromagnet facing the rotor disc, and a second sensor disposed on a surface of an electromagnet core of the second axial electromagnet facing the rotor disc. Excitation current of the axial magnetic bearing is controlled based on a differential signal between a signal from the first sensor and a signal from the second sensor.

The axial displacement sensor includes a coil to which high-frequency voltage is applied, and a ferrite core member disposed at a periphery of the coil excluding a rotor disc side.

A ferrite core member is provided in a region of the rotor disc facing the axial displacement sensor.

A groove is formed at at least one of opposing surfaces of the rotor disc and the electromagnet core between a magnetic path region of the axial displacement sensor and a magnetic path region of the axial magnetic bearing.

The axial displacement sensor includes a coil to which high-frequency voltage is applied, and a groove is formed at at least one of opposing surfaces of the rotor disc and the electromagnet core between a magnetic path region of the axial displacement sensor and a magnetic path region of the axial magnetic bearing.

The rotor disc is fixed to an end portion of the rotor shaft, and a positioning member configured to determine an axial position of the rotor disc is provided and inserted between the rotor disc and the end portion of the rotor shaft.

A vacuum pump comprises: the magnetic bearing device according to claim 1 configured to magnetically levitate and support a rotor shaft of a pump rotor; and a motor configured to rotatably drive the pump rotor.

According to the present invention, a variation in sensor properties of the axial displacement sensor among machines can be reduced.

DETAILED DESCRIPTION OF THE EXEMPLARY EMBODIMENTS

Figure 1:
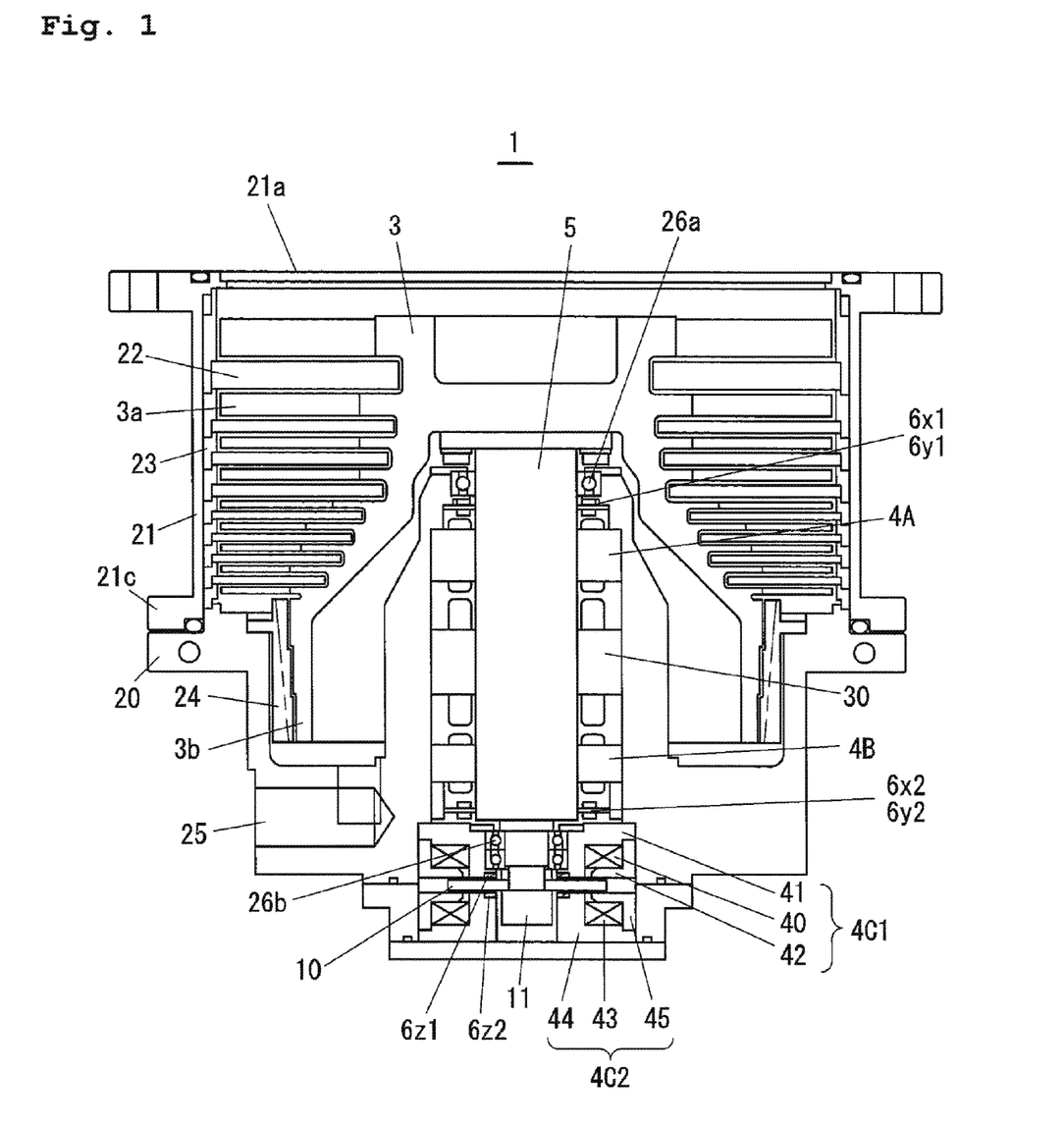
FIG. 1 is a view of a schematic configuration of a magnetic bearing turbo-molecular pump including a magnetic bearing device.

Hereinafter, an embodiment of the present invention will be described with reference to the drawings. FIG. 1 is a view of a schematic configuration of a magnetic bearing turbo-molecular pump including a magnetic bearing device. The turbo-molecular pump includes a pump main body 1 and a control unit configured to drive and control the pump main body 1. Note that the control unit is not shown in FIG. 1.

A rotor shaft 5 provided at a pump rotor 3 is non-contact supported by radial magnetic bearings 4A, 4B and an axial magnetic bearing 4C. Each of the magnetic bearings 4A, 4B includes four radial electromagnets arranged in a radial direction of the rotor shaft 5. The axial magnetic bearing 4C includes a pair of axial electromagnets 4C1, 4C2 arranged to sandwich, in an axial direction, a rotor disc 10 fixed to a lower portion of the rotor shaft 5. The rotor disc 10 is fixed to the rotor shaft 5 with a nut 11.

Displacement of the rotor shaft 5 is detected by radial displacement sensors 50x1, 50y1, 50x2, 50y2 and axial displacement sensors 6z1, 6z2. An inductance displacement sensor is used as each of the displacement sensors 50x1, 50y1, 50x2, 50y2, 6z1, 6z2.

The axial electromagnet 4C1 on the upper side as viewed in the figure includes an electromagnet coil 40 and cores 41, 42, and the axial electromagnet 4C2 on the lower side as viewed in the figure includes an electromagnet coil 43 and cores 44, 45. The axial displacement sensors 6z1, 6z2 are arranged facing each other to sandwich the rotor disc 10, the axial displacement sensor 6z1 is provided on a lower end surface of the core 41, and the axial displacement sensor 6z2 is provided on an upper end surface of the core 44.

The pump rotor 3 magnetically and rotatably levitated by the magnetic bearings 4A, 4B, 4C is rotatably driven at high speed by a motor 30. For example, a brushless DC motor is used as the motor 30. Note that the motor 30 is schematically illustrated in FIG. 1. More specifically, a portion indicated by a reference numeral "30" forms a motor stator, and a motor rotor is provided at the rotor shaft 5. Note that when the magnetic bearings are not in operation, the rotor shaft 5 is supported by emergency mechanical bearings 26a, 26b.

The pump rotor 3 is provided with a plurality of rotor blades 3a and a cylindrical portion 3b forming a rotary-side exhaust function section. On the other hand, stationary blades 22 and a screw stator 24 forming a stationary-side exhaust function section are provided on a stationary side. The stationary blades 22 and the rotor blades 3a are alternately arranged in the axial direction. The screw stator 24 is provided with a predetermined gap on an outer peripheral side of the cylindrical portion 3b.

Each stationary blade 22 is placed on a base 20 with a corresponding one of spacer rings 23 being interposed therebetween. When a fixed flange 21c of a pump case 21 is fixed to the base 20 with bolts, the stack of spacer rings 23 is sandwiched between the base 20 and the pump case 21, and therefore, the position of each stationary blade 22 is determined. The base 20 is provided with an exhaust port 25, and a back pump is connected to the exhaust port 25. The pump rotor 3 is magnetically levitated while being rotatably driven at high speed by the motor 30, and in this manner, gas molecules are exhausted from a suction port 21a toward the exhaust port 25.

Figure 2A:
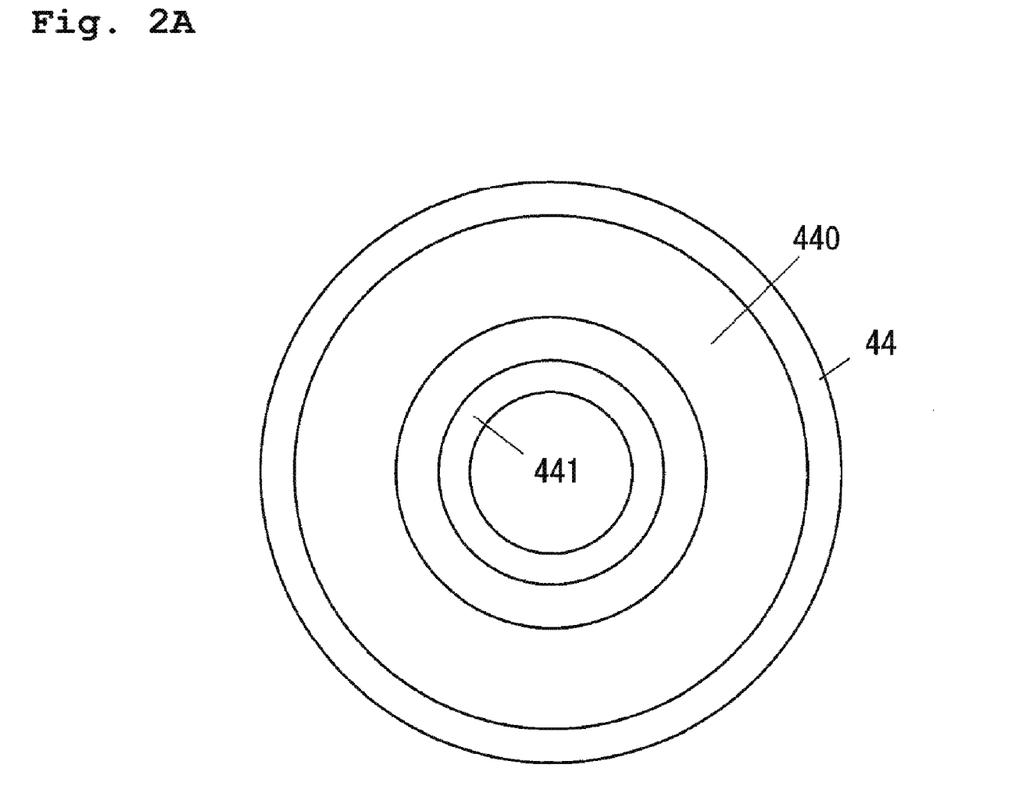
FIGS. 2A and 2B are views of the shape of a core of an axial electromagnet.
Figure 2B:
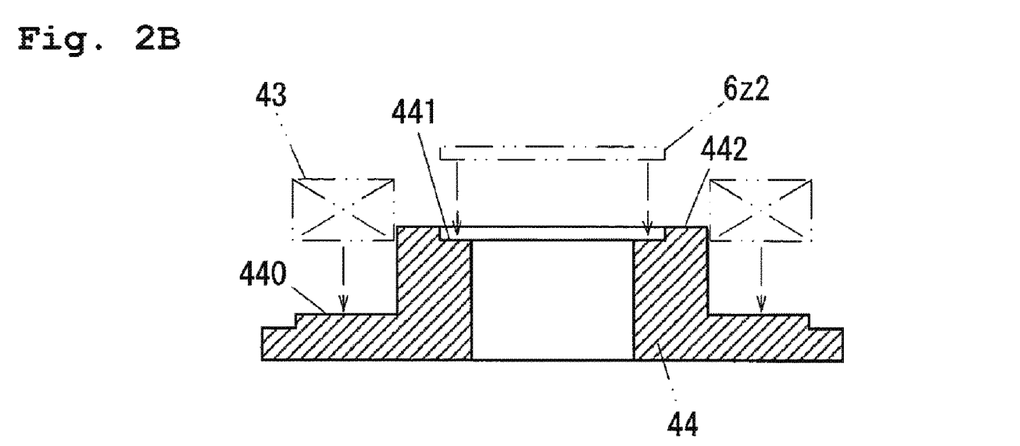

FIGS. 2A and 2B are views of the core 44 of the axial electromagnet 4C2. FIG. 2A is a plan view, and FIG. 2B is a sectional view. The core 44 is provided with a coil arrangement portion 440 on which the electromagnet coil 43 is disposed and a sensor arrangement portion 441 on which the axial displacement sensor 6z2 is disposed. The sensor arrangement portion 441 is a ring-shaped recess, and the ring-shaped axial displacement sensor 6z2 is disposed in such a recess. Although not shown in the figure, the core 41 of the axial electromagnet 4C1 is, at a lower end surface of the core 41, similarly provided with a sensor arrangement portion including a ring-shaped recess, and the ring-shaped axial displacement sensor 6z1 is disposed in such a recess. Note that in an example illustrated in FIG. 2B, the recess forming the sensor arrangement portion 441 is formed by counter boring, but may be a ring-shaped groove.

Figure 3A:
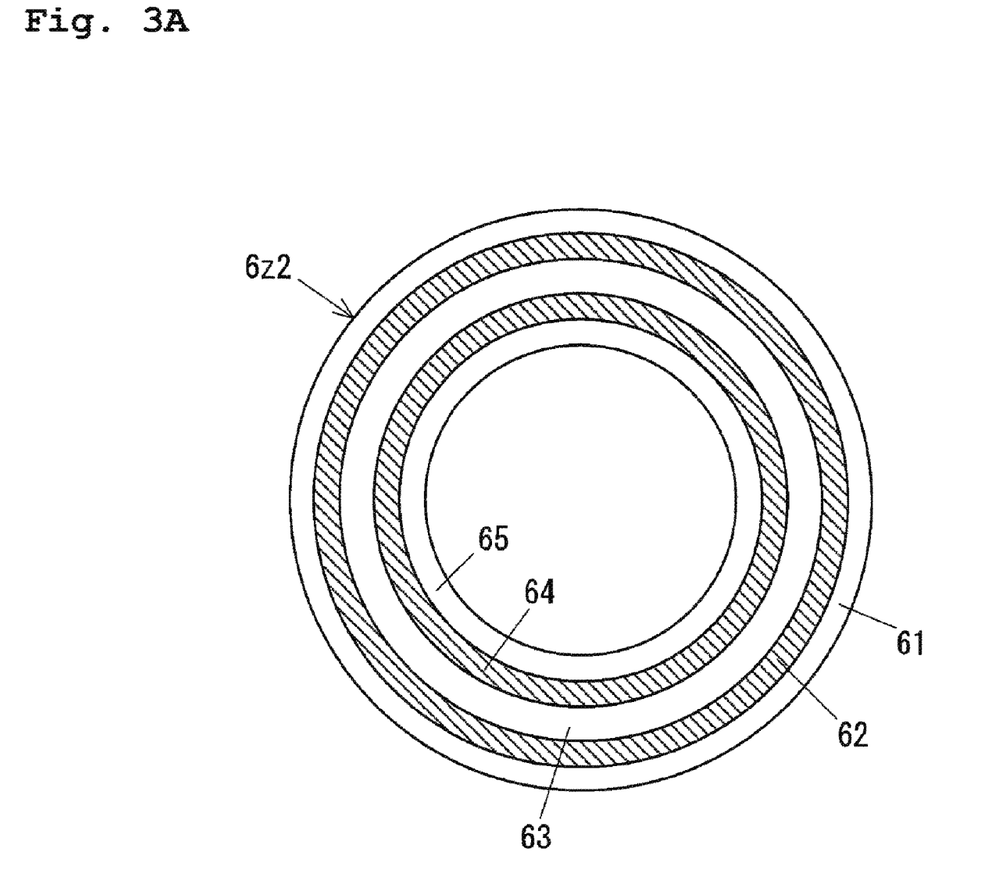
FIGS. 3A and 3B are views of a configuration of an axial displacement sensor.
Figure 3B:
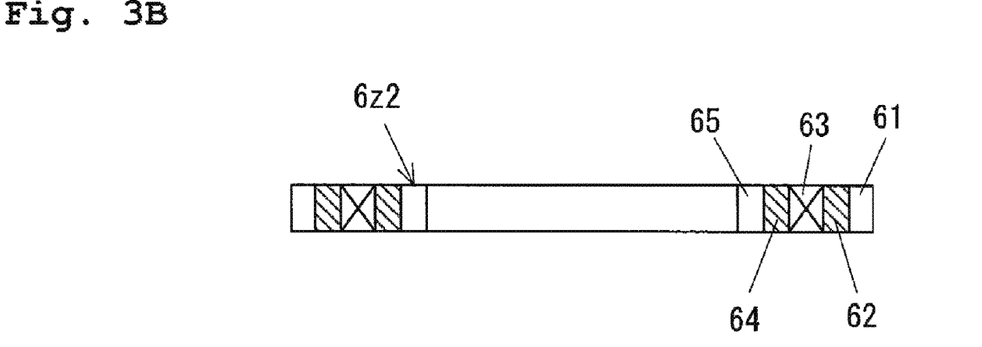

FIGS. 3A and 3B are views of the configuration of the axial displacement sensor 6z2. FIG. 3A is a plan view, and FIG. 3B is a sectional view. Note that the axial displacement sensor 6z1 has the same configuration as that of the axial displacement sensor 6z2 of FIGS. 3A and 3B. The axial displacement sensor 6z2 is configured such that an outer buffer ring 61, an outer ferrite ring 62, a ring-shaped air-core coil 63, an inner buffer ring 65, and an inner ferrite ring 64 are concentrically arranged. Nickel-zinc-based ferrite is suitable for the ferrite rings 62, 64.

These members are arranged on the sensor arrangement portion 441 at a rotor-disc-side end surface of the core 44, and are fixed with an adhesive such as epoxy resin. At this point, the entirety of the members forming the axial displacement sensor 6z2 may be molded with, e.g., epoxy resin. Note that in the case of resin molding of the entirety of the components of the axial displacement sensor 6z2, the outer buffer ring 61 and the inner buffer ring 65 as protection members configured to protect the ferrite rings 62, 64 from impact etc. may be omitted. In this example, the groove depth of the sensor arrangement portion 441 is set such that an upper end surface of the axial displacement sensor 6z2 and the upper end surface (the rotor-disc-side end surface) of the core 44 are substantially flush with each other. That is, the axial positions of the core end surface and the displacement sensor end surface with respect to the rotor disc 10 are substantially the same as each other.

Figure 4:
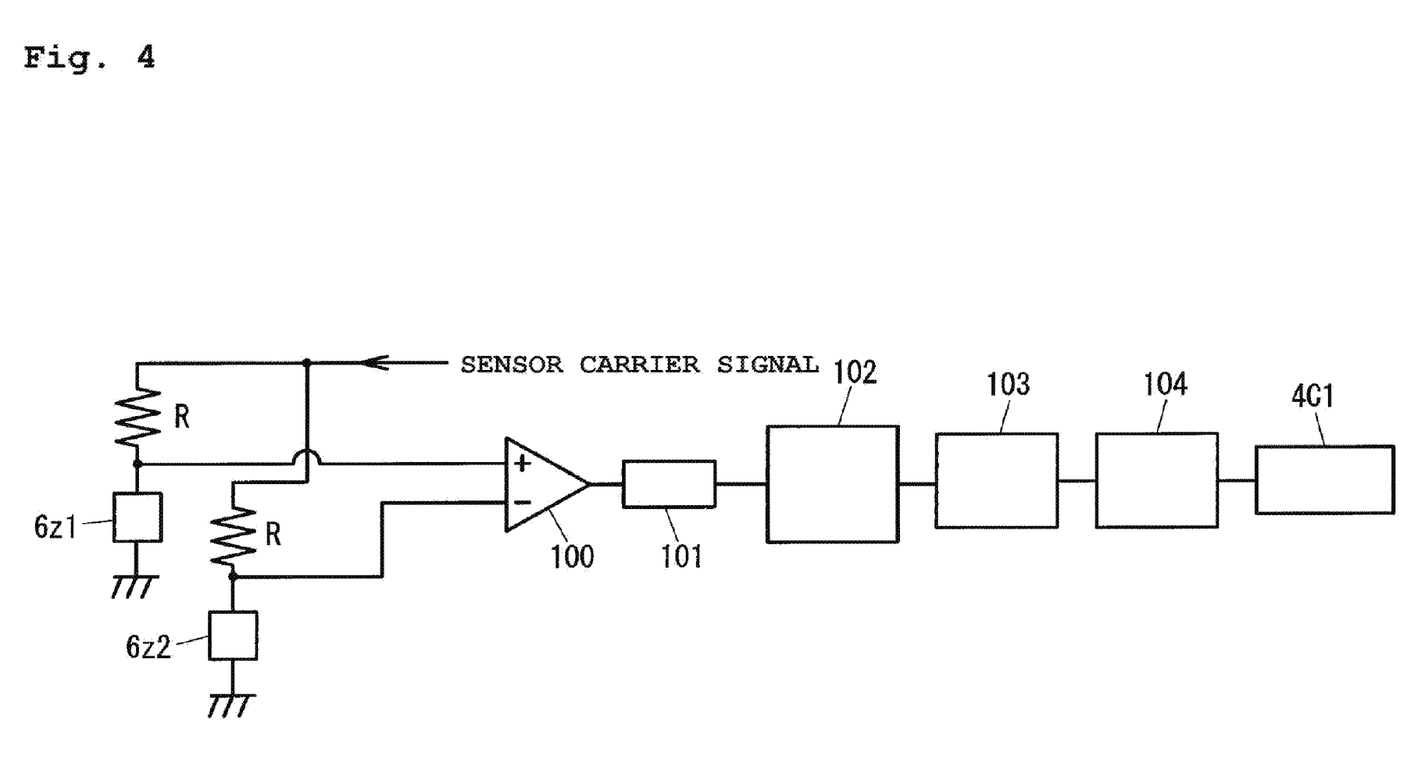
FIG. 4 is a control block diagram of the axial electromagnet in an embodiment.

FIG. 4 is a block diagram for describing control of the axial electromagnet 4C1 based on signals of the axial displacement sensors 6z1, 6z2. Sensor carrier voltage (a sensor carrier signal) with a high frequency (normally 10-kHz-order) is applied to the axial displacement sensors 6z1, 6z2 via a resistor R. The resistor R is set to R>Lω with respect to the inductance L of the axial displacement sensor 6z1, 6z2. The symbol "ω" indicates the angular frequency of the sensor carrier signal.

The magnitude (ωL) of the impedance of the axial displacement sensor 6z1, 6z2 is in an inverse relationship with a gap dimension between the axial displacement sensor 6z1, 6z2 and the rotor disc 10 as a sensor target. Thus, when the above-described gap dimension changes due to axial displacement of the rotor disc 10 rotating together with the rotor shaft 5, the sensor carrier signal is amplitude-modulated according to an impedance change at the time. The amplitude-modulated sensor carrier signal is hereinafter referred to as a "displacement modulated wave signal."

The displacement modulated wave signal output from the axial displacement sensor 6z1 and the displacement modulated wave signal output from the axial displacement sensor 6z1 are input to a difference amplifier 100. A differential signal between these displacement modulated wave signals is output from the difference amplifier 100. The differential signal output from the difference amplifier 100 is subjected to bandpass processing focusing the angular frequency w in a filter 101.

The signal output from the filter 101 is input to a demodulation section 102, and demodulation arithmetic processing is performed in the demodulation section 102. An arithmetic result of the demodulation section 102 is input to a levitation control section 103. The levitation control section 103 performs proportional control, integral control, derivative control, phase correction, and other types of control compensation based on the arithmetic result of the demodulation section 102, thereby generating a levitation control current setting. Then, an excitation amplifier 104 is driven based on the levitation control current setting, and excitation current supplied to the axial electromagnet 4C1 is controlled.

Figure 5:
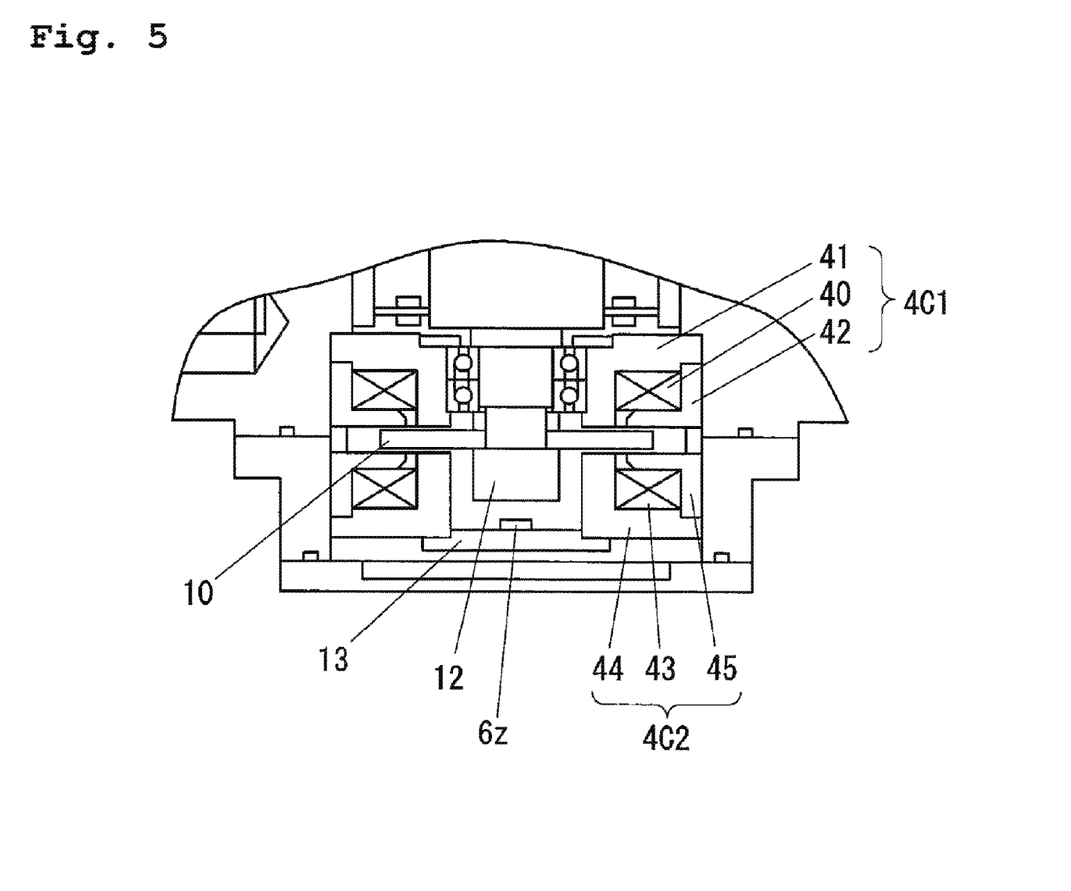
FIG. 5 is a view of an example of a configuration of an axial displacement sensor in a typical magnetic bearing device.

For example, an axial displacement sensor 6z in a typical magnetic bearing device is disposed facing a nut 12 fastened to an end surface (a lower end surface) of a rotor shaft as illustrated in FIG. 5. The axial displacement sensor 6z detects, as a displacement signal, a change in a gap between the axial displacement sensor 6z and the nut 12. The nut 12 as a sensor target also functions as a fastening tool for fixing a rotor disc 10 to the rotor shaft, and the axial position of the nut 12 slightly changes depending on the degree of fastening upon assembly.

Moreover, the axial displacement sensor 6z is mounted on a substrate 13 attached to a lower end surface of a core 44 of an axial electromagnet 4C2. Thus, there is a variation in the axial position of the axial displacement sensor 6z among machines due to a lamination error, an assembly error, etc. That is, a gap dimension between the axial displacement sensor 6z and a target surface of the nut 12 varies among machines, and a variation in sensor sensitivity due to such a variation becomes an issue. For this reason, for solving the variation in sensor sensitivity, a mechanical adjustment configuration or an electric adjustment configuration (e.g., an adjustment mechanism using a trimmer resistor etc.) is provided.

Figure 10:
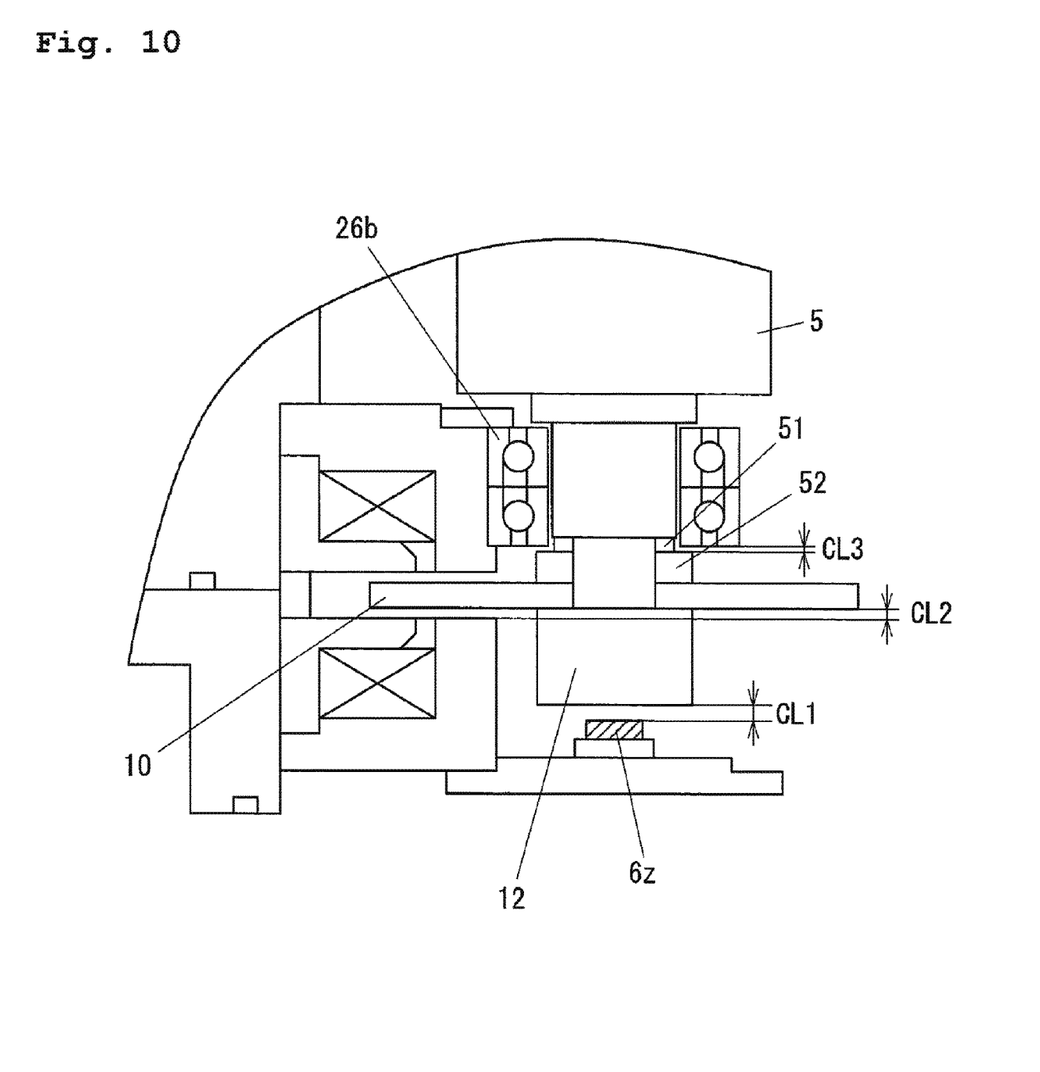
FIG. 10 is a view of an example of a mechanical adjustment mechanism in the configuration illustrated in FIG. 5.

FIG. 10 is a view of an example of the mechanical adjustment mechanism in the case of the typical configuration illustrated in FIG. 5. In the example illustrated in FIG. 10, the mechanical adjustment mechanism is provided in the vicinity of a mechanical bearing 26b functioning as a touchdown bearing. In mechanical adjustment, a clearance CL1 between the axial displacement sensor 6z and the target (the nut 12) and a rotor disc position CL2 between axial electromagnets need to be adjusted. In addition to adjustment of CL1, CL2, a clearance CL3 in an axial direction of a rotor shaft 5 is adjusted, and each of CL1, CL2, and CL3 is properly shim-adjusted by selection of the height dimensions of two ring-shaped adjustment members 51, 52. This leads to a problem that adjustment requires great care.

(C1) On the other hand, in the present embodiment, the axial displacement sensors 6z1, 6z2 are, as illustrated in FIG. 1, arranged on the surfaces of the cores 41, 44 of the axial electromagnets 4C1, 4C2 forming the axial magnetic bearing 4C, the surfaces facing the rotor disc 10. Thus, a positional relationship of the axial displacement sensors 6z1, 6z2 with respect to the rotor disc 10 can be substantially the same as a positional relationship of the cores 41, 44 with respect to the rotor disc 10. As a result, the process of adjusting the axial displacement sensor 6z as an essential process in the case of the typical configuration as illustrated in FIGS. 5 and 10 can be omitted.

Figure 11:
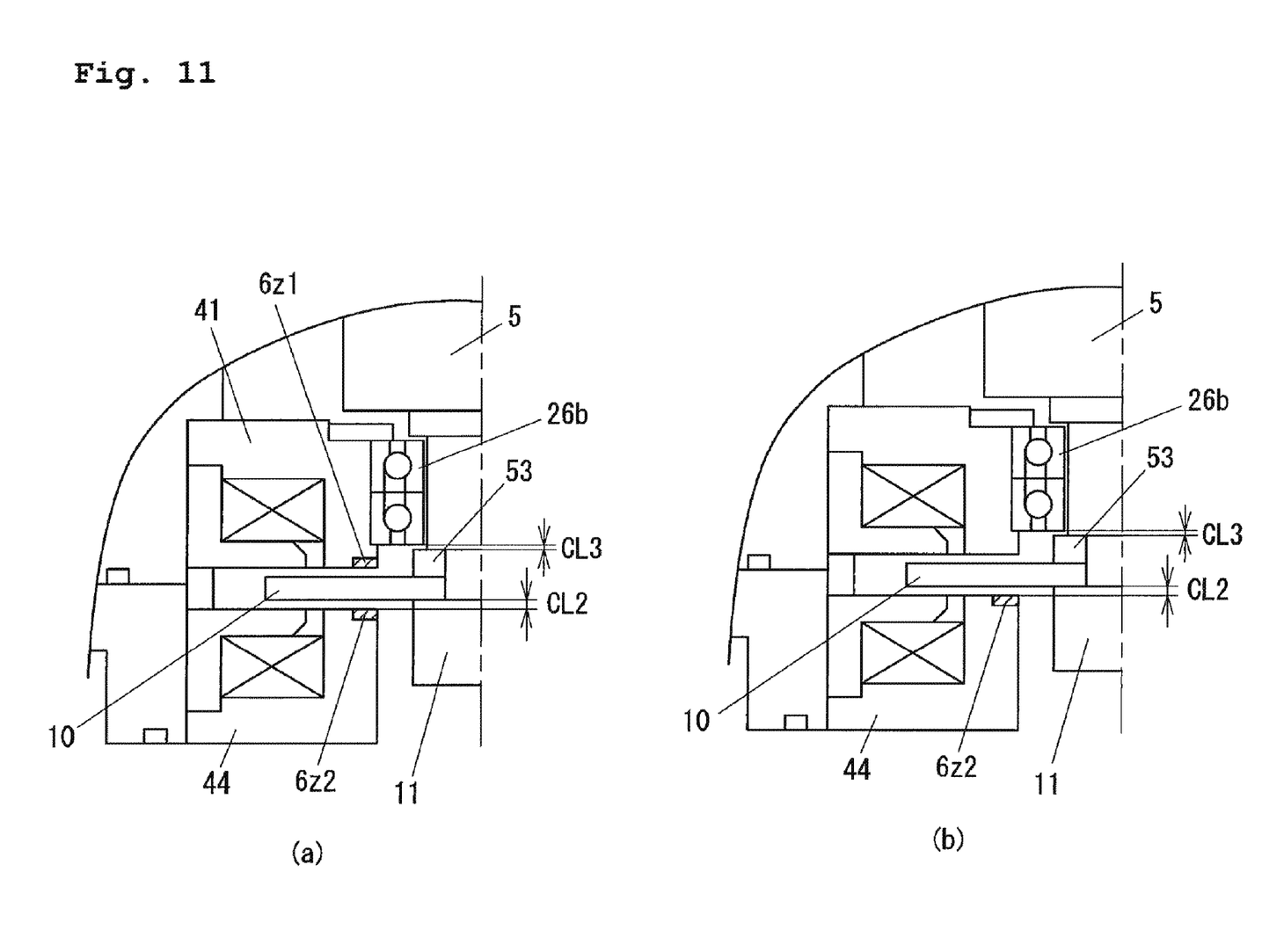
FIG. 11 is a view of an example of a mechanical adjustment mechanism in the embodiment.

For example, as illustrated in FIG. 11A, a clearance between the axial displacement sensor 6z2 and the rotor disc 10 as the target is the same as the clearance CL2 relating to the position of the rotor disc 10 between the axial electromagnets, and both clearances can be simultaneously adjusted. That is, each of the clearances CL2, CL3 can be adjusted by a single ring-shaped adjustment member 53, and therefore, improvement of nonlinearity as described later can be realized.

Moreover, redundancy for the clearance CL2 is allowed, and a variation in the clearance CL3 with the axial stroke of the rotor shaft 5 is small. Thus, mechanical adjustment is not necessary. Thus, the ring-shaped adjustment member 53 and the rotor disc 10 with fixed height dimensions are fastened together with the nut 11, and therefore, the clearances CL2, CL3 can be set. Note that the ring-shaped adjustment member 53 is also used as a member configured to contact, as viewed in the figure, a lower end surface of an inner ring of the mechanical bearing 26b functioning as the touchdown bearing, thereby defining a movable range (a movable range toward a pump suction port side) in the axial direction of the rotor shaft 5.

Further, the nut 12 with the typical configuration illustrated in FIG. 5 is used as the sensor target, but the nut 11 of the present embodiment is merely used to fix the rotor disc 10. Thus, a commonly-used nut can be used without the need for a complicated structure. Further, in a case where the nut 12 is the sensor target, the nut 12 needs to be configured as the sensor target, and the axial displacement sensor 6z needs to be disposed facing the nut 12. However, in the present embodiment, the axial displacement sensors 6z1, 6z2 are arranged respectively on the cores 41, 44. Thus, the axial dimension of the pump main body 1 can be more decreased.

Note that in the embodiment illustrated in FIG. 1, a differential configuration is made such that the pair of axial displacement sensors 6z1, 6z2 is provided to sandwich the rotor disc 10. However, only one of the axial displacement sensors 6z1, 6z2 may be disposed. In this case, reduction of the lamination error and simplification of the sensor adjustment process can be also realized as in the above-described case. FIG. 11B is a view of an attachment configuration of the rotor disc 10 in the case of providing only the axial displacement sensor 6z2 on the core 44. In this case, each of the clearances CL2, CL3 can be adjusted by the single ring-shaped adjustment member 53 as in the case of FIG. 11A.

(C2) Further, in the present embodiment, the axial displacement sensors 6z1, 6z2 are arranged respectively on the rotor disc facing surfaces of the cores 41, 44 of the two axial electromagnets 4C1, 4C2 arranged respectively facing the front and back surfaces of the rotor disc 10, and the excitation current of the axial magnetic bearing 4C is controlled based on the differential signal as a difference between a sensor signal of the axial displacement sensor 6z1 and a sensor signal of the axial displacement sensor 6z2. Thus, nonlinearity of an axial displacement signal can be improved as described later. Disturbance responsiveness, stability, and levitation controllability are improved.

Figure 6:
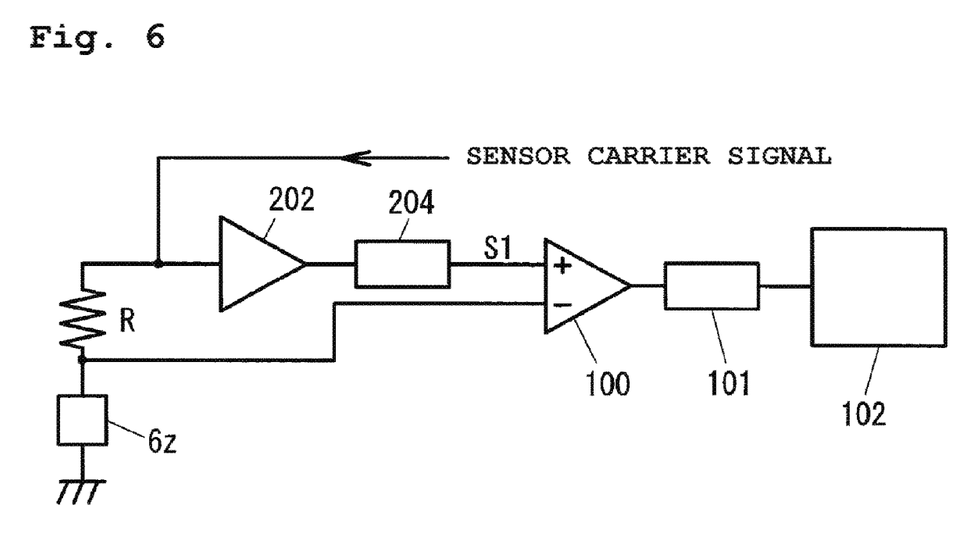
FIG. 6 is a control block diagram of the axial displacement sensor illustrated in FIG. 5.

On the other hand, in the case of the typical configuration illustrated in FIG. 5, only the single axial displacement sensor 6z is provided. Thus, as illustrated in FIG. 6, a dummy signal S1 for offset removal is input to the difference amplifier 100, and in this manner, a displacement modulated wave signal is pseudo-differentiated. Thus, there is a disadvantage that a relationship between actual displacement and a voltage value as a displacement signal is not linear, but shows greater nonlinearity.

FIG. 6 is a control block diagram in the case of the axial displacement sensor 6z illustrated in FIG. 5. The dummy signal S1 is formed in such a manner that a sensor carrier signal is gain-adjusted by a gain adjustment section 202 and is further phase-adjusted to have the same phase as that of the displacement modulated wave signal in a phase shift circuit 204.

Figure 7A:
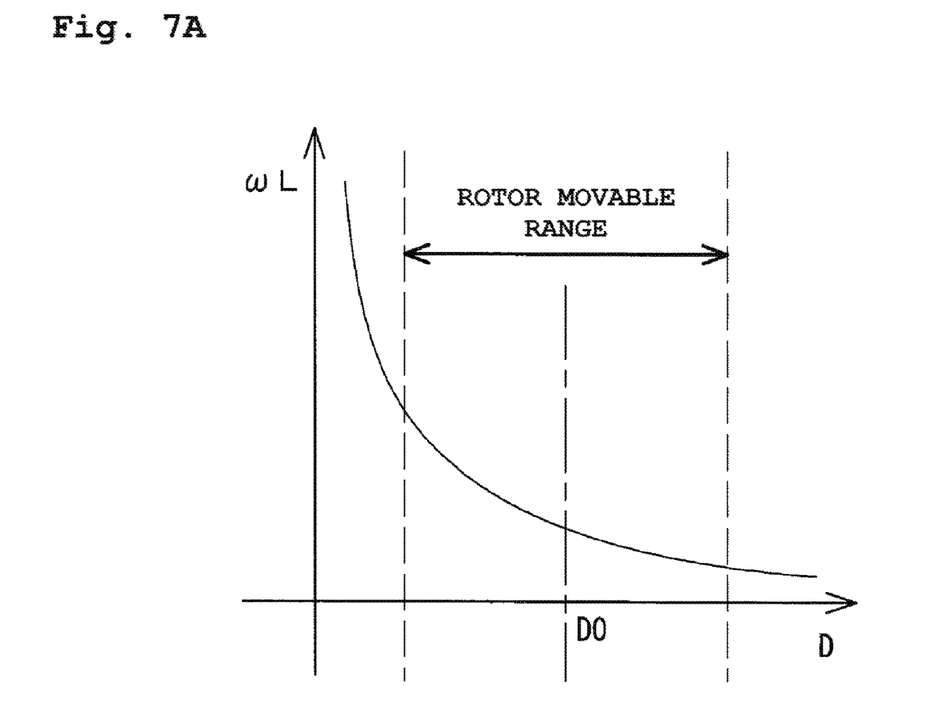
FIGS. 7A and 7B are graphs for describing an axial displacement signal in the case of the configuration of FIG. 5.
Figure 7B:
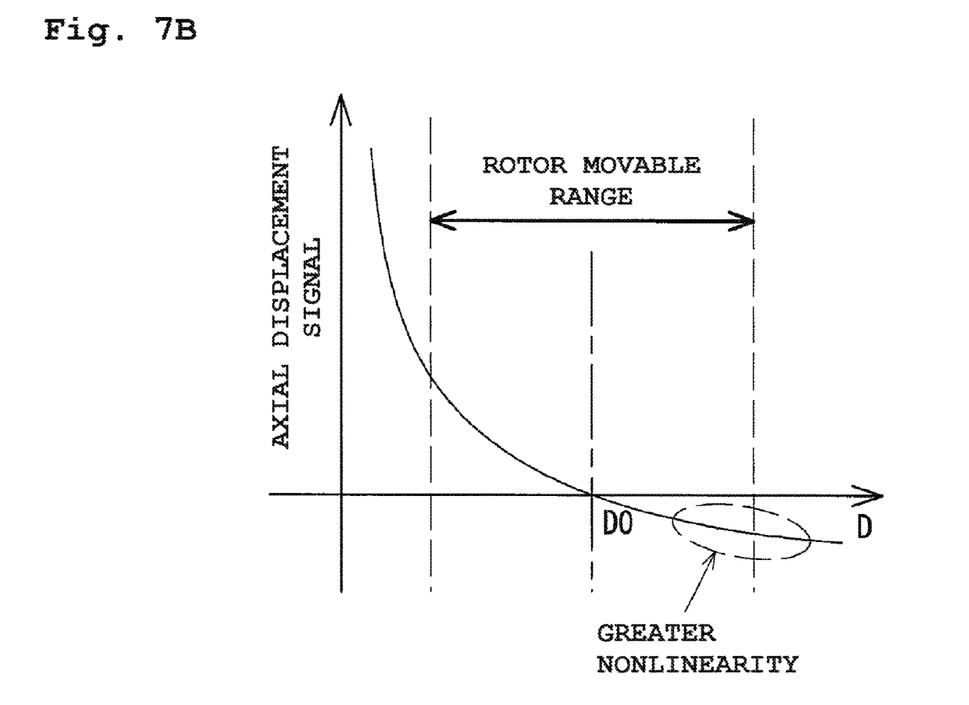

Supposing that a predetermined reference levitation position of the rotor disc 10 is D0 and a displacement increment from the reference levitation position D0 is Δd, the gap dimension between the axial displacement sensor 6z and the sensor target is D0+Δd. That is, the magnitude ωL of the impedance and the gap dimension D0+Δd are in an inverse proportional relationship as in Expression (1) described later. In this case, nonlinearity in a hyperbolic relationship as in FIGS. 7A and 7B is shown such that a greater negative value of Δd results in a greater impedance and that a greater positive value of Δd results in a smaller impedance.

$$\omega L \propto 1/(D0+\Delta d) \quad (1)$$

Normally, R is selected to satisfy R>ωL, and voltage with an amplitude substantially proportional to an impedance change caused by a gap change due to rotor movement is generated. Such voltage is a voltage signal obtained by amplitude modulation of the sensor carrier signal due to the gap change, and the dummy signal S1 is generated such that the demodulated axial displacement signal becomes zero when the rotor position is the above-described reference levitation position D0. Further fine adjustment is performed such that the value at the reference levitation position D0 becomes zero even after demodulation, but nonlinearity of the axial displacement signal used for levitation control is not improved (FIG. 7B) as in FIG. 7A.

Figure 8:
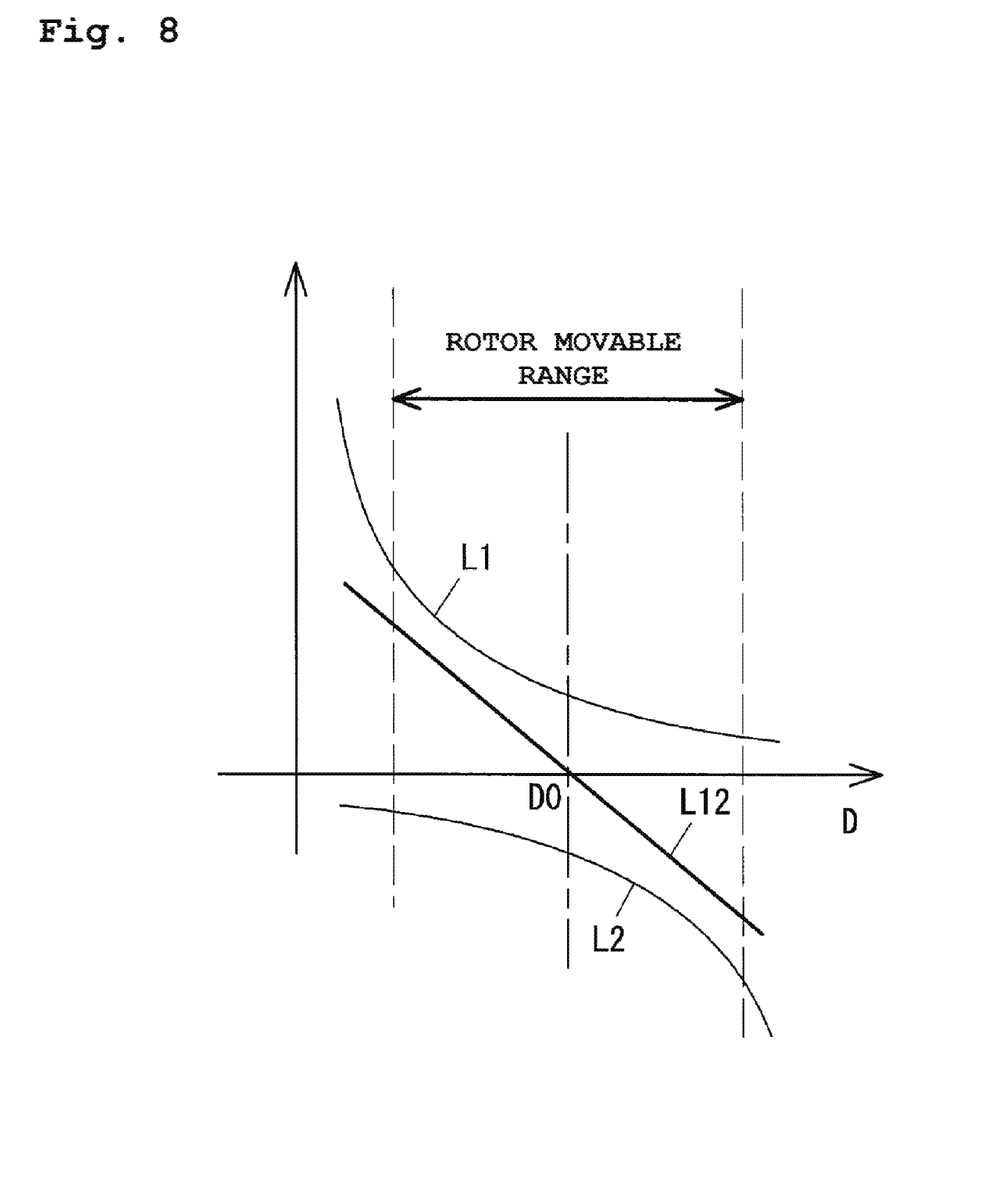
FIG. 8 is a graph for describing an axial displacement signal in the embodiment.

On the other hand, in the present embodiment, the two axial displacement sensors $6z1$, $6z2$ are provided respectively facing the front and back surfaces of the rotor disc 10. As illustrated in FIG. 4, the differential signal of the displacement modulated wave signals output from the axial displacement sensors $6z1$, $6z2$ is demodulated and used for levitation control. In FIG. 8, a curve L1 shows the amplitude of the displacement modulated wave signal output from the axial displacement sensor $6z1$, and a curve L2 shows the amplitude of the displacement modulated wave signal output from the axial displacement sensor $6z2$. The vertical axis of FIG. 8 represents a signal amplitude such as a voltage value.

In the present embodiment, the configuration of FIG. 1 allows a middle position between the axial electromagnets 4C1, 4C2 and a middle position between the axial displacement sensors $6z1$, $6z2$ to be substantially coincident with each other. Thus, when the gap change on a side close to the axial displacement sensor $6z1$ is Δd, it may be considered that the gap change on a side close to the axial displacement sensor $6z2$ is −Δd and that the curve L1 and the curve L2 are substantially symmetrical with respect to a D0 point on a D-axis. As a result, a curve L12 showing the differential signal of the two displacement modulated wave signals is substantially a straight line. Thus, nonlinearity is substantially cleared without the need for fine adjustment after demodulation.

Figure 9:
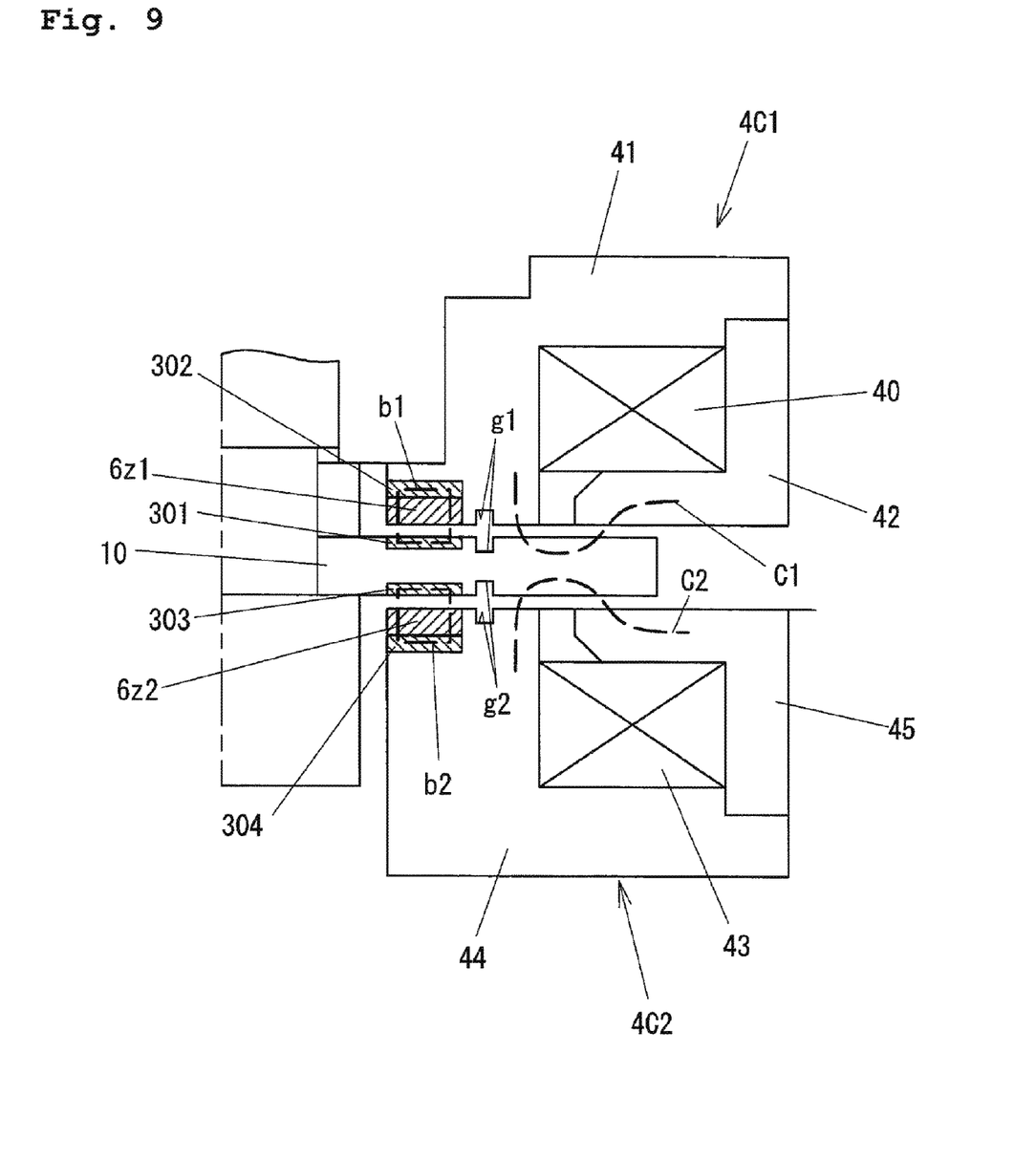
FIG. 9 is a view of a variation.

FIG. 9 is a view of a variation. In the variation, a ferrite ring 302 is provided on a groove bottom portion of the core 41 on which the axial displacement sensor $6z1$ is disposed, and a ferrite ring 304 is provided on a groove bottom portion of the core 44 on which the axial displacement sensor $6z2$ is disposed. Further, a ferrite ring 301 is disposed on a surface of the rotor disc 10 facing the axial displacement sensor $6z1$, and a ferrite ring 303 is disposed on a surface of the rotor disc 10 facing the axial displacement sensor $6z2$. A dashed line b1 schematically shows a magnetic path for the axial displacement sensor $6z1$, and a dashed line b2 schematically shows a magnetic path for the axial displacement sensor $6z1$.

(C3) As described above, the ferrite rings 302, 304 are arranged on back sides (groove bottom portion sides) of the axial displacement sensors $6z1$, $6z2$, and therefore, magnetic flux leakage on sides close to the cores 41, 44 can be reduced.

(C4) Moreover, the ferrite rings 301, 303 as ferrite core members are provided in regions of the rotor disc 10 facing the axial displacement sensors $6z1$, $6z2$. Thus, magnetic flux leakage at the rotor disc 10 can be reduced, and a magnetic flux formed by the air-core coil 63 can be concentrated on between the axial displacement sensor $6z1$ and the ferrite ring 301 and between the axial displacement sensor $6z2$ and the ferrite ring 303.

(C5, C6) Further, as illustrated in FIG. 9, a groove g1 may be formed at at least one of opposing surfaces of the rotor disc 10 and the core 41 between a region (a magnetic path region) where the magnetic path b1 of the axial displacement sensor $6z1$ passes and a region (a magnetic path region) where a magnetic path C1 of the axial electromagnet 4C1 passes, and a groove g2 may be formed at at least one of opposing surfaces of the rotor disc 10 and the core 44 between a region (a magnetic path region) where the magnetic path b2 of the axial displacement sensor $6z2$ passes and a region (a magnetic path region) where a magnetic path C2 of the axial electromagnet 4C2 passes. In an example illustrated in FIG. 9, the groove g1 is formed in each of the opposing surfaces of the rotor disc 10 and the core 41, and the groove g2 is formed in each of the opposing surfaces of the rotor disc 10 and the core 44.

With these grooves g1, g2, the magnetic paths b1, b2 can be easily separated from the magnetic paths C1, C2. Thus, influence of an electromagnet flux on the axial displacement signal can be reduced. Note that in the case of forming the groove g1, g2 at either one of the rotor disc 10 or the core 41, 44, a priority is given to the core 41, 44 as a side on which the magnetic path C1, C2 is formed.

A variety of embodiment and variations have been described above, but the present invention is not limited to these contents. Other aspects conceivable within the scope of the technical idea of the present invention are also included in the scope of the present invention. For example, the magnetic bearing device used for the turbo-molecular pump has been described as an example in the above-described embodiment, but the present invention is not limited to such an example. The present invention is also applicable to various magnetic bearing devices. Moreover, in the above-described embodiment, the radial magnetic bearing is also configured to perform bearing control based on the signals from the displacement sensors as in the axial magnetic bearing. However, the radial magnetic bearing may be a self-sensing type radial magnetic bearing using no displacement sensor or a passive radial magnetic bearing using a permanent magnet.

What is claimed is:

1. A magnetic bearing device comprising:
   a radial magnetic bearing configured to magnetically levitate and support a rotor shaft in a radial direction;
   an axial magnetic bearing configured to magnetically levitate and support, in an axial direction, a rotor disc rotatable together with the rotor shaft; and
   an axial displacement sensor disposed on a surface of an electromagnet core of the axial magnetic bearing facing the rotor disc and configured to detect axial displacement of the rotor disc,
   wherein
   the axial magnetic bearing includes a first axial electromagnet disposed facing a front side of the rotor disc, and a second axial electromagnet disposed facing a back side of the rotor disc,
   the axial displacement sensor includes a first sensor disposed on a surface of an electromagnet core of the first axial electromagnet facing the rotor disc, and a second sensor disposed on a surface of an electromagnet core of the second axial electromagnet facing the rotor disc, and
   excitation current of the axial magnetic bearing is controlled based on a differential signal between a signal from the first sensor and a signal from the second sensor.

2. The magnetic bearing device according to claim 1, wherein
   the axial displacement sensor includes a coil to which high-frequency voltage is applied, and a ferrite core member disposed at a periphery of the coil excluding a rotor disc side.

3. The magnetic bearing device according to claim 2, wherein a ferrite core member is provided in a region of the rotor disc facing the axial displacement sensor.

4. A magnetic bearing device comprising:
a radial magnetic bearing configured to magnetically levitate and support a rotor shaft in a radial direction;
an axial magnetic bearing configured to magnetically levitate and support, in an axial direction, a rotor disc rotatable together with the rotor shaft; and
an axial displacement sensor disposed on a surface of an electromagnet core of the axial magnetic bearing facing the rotor disc and configured to detect axial displacement of the rotor disc,
wherein
the axial displacement sensor includes a coil to which high-frequency voltage is applied, and a ferrite core member disposed at a periphery of the coil excluding a rotor disc side, and
a groove is formed at least one of opposing surfaces of the rotor disc and the electromagnet core between a magnetic path region of the axial displacement sensor and a magnetic path region of the axial magnetic bearing.

5. A magnetic bearing device comprising:
a radial magnetic bearing configured to magnetically levitate and support a rotor shaft in a radial direction;
an axial magnetic bearing configured to magnetically levitate and support, in an axial direction, a rotor disc rotatable together with the rotor shaft; and
an axial displacement sensor disposed on a surface of an electromagnet core of the axial magnetic bearing facing the rotor disc and configured to detect axial displacement of the rotor disc,
wherein
the axial displacement sensor includes a coil to which high-frequency voltage is applied, and
a groove is formed at at least one of opposing surfaces of the rotor disc and the electromagnet core between a magnetic path region of the axial displacement sensor and a magnetic path region of the axial magnetic bearing.

6. The magnetic bearing device according to claim 1, wherein
the rotor disc is fixed to an end portion of the rotor shaft, and
a positioning member configured to determine an axial position of the rotor disc is provided and inserted between the rotor disc and the end portion of the rotor shaft.

7. A vacuum pump comprising:
the magnetic bearing device according to claim 1, configured to magnetically levitate and support a rotor shaft of a pump rotor; and
a motor configured to rotatably drive the pump rotor.

* * * * *